(12) United States Patent
Salomon et al.

(10) Patent No.: US 11,002,406 B2
(45) Date of Patent: May 11, 2021

(54) COUPLING FOR PRESSURE LINES

(71) Applicant: UMETA HERMANN ULRICHSKÖTTER METALLWARENFABRIK GMBH & CO. KG, Bielefeld (DE)

(72) Inventors: Thomas Salomon, Verl (DE); Frank Maser, Bielefeld (DE)

(73) Assignee: Frank Maser, Bielefeld (DE)

(*) Notice: Subject to any disclaimer, the term of this patent is extended or adjusted under 35 U.S.C. 154(b) by 259 days.

(21) Appl. No.: 16/337,050

(22) PCT Filed: Sep. 18, 2017

(86) PCT No.: PCT/EP2017/073489
§ 371 (c)(1),
(2) Date: Mar. 27, 2019

(87) PCT Pub. No.: WO2018/059990
PCT Pub. Date: Apr. 5, 2018

(65) Prior Publication Data
US 2020/0032957 A1 Jan. 30, 2020

(30) Foreign Application Priority Data
Sep. 27, 2016 (DE) .......................... 202016105383.8

(51) Int. Cl.
*F16L 37/12* (2006.01)
*F16N 21/04* (2006.01)
(52) U.S. Cl.
CPC ............ *F16N 21/04* (2013.01); *F16L 37/122* (2013.01)

(58) Field of Classification Search
CPC ........ F16L 37/122; F16L 37/127; F16N 21/04
USPC ........................... 285/102; 184/105.1, 105.2
See application file for complete search history.

(56) References Cited

U.S. PATENT DOCUMENTS

| | | | |
|---|---|---|---|
| 2,061,062 A * | 11/1936 | Davis | F16N 21/04 137/244 |
| 2,168,915 A | 8/1939 | Ostendorf | |
| 2,263,850 A | 11/1941 | Nielsen | |
| 2,274,753 A * | 3/1942 | Sundholm | F16N 21/04 285/102 |

(Continued)

FOREIGN PATENT DOCUMENTS

| | | |
|---|---|---|
| CH | 335282 A | 12/1958 |
| DE | 3247784 C1 | 6/1984 |

(Continued)

*Primary Examiner* — David Bochna
(74) *Attorney, Agent, or Firm* — Richard M. Goldberg

(57) ABSTRACT

A coupling for pressure lines, having a housing (10) which has a continuous conveying duct (12) for a pressurised medium and can be connected by one end to a pressure source and attached by the opposite end to a connection nipple (30), and having retaining jaws (136) which are arranged around the mouth of the conveying duct opening into the connection nipple (30) and which can be fixed by a locking mechanism in a position in which they engage around the connection nipple (30), in which the retaining jaws (36) are each supported on a pivot bearing (38) and have, at the end remote from the connection nipple (30), beyond pivot bearing (38), an actuating arm (42) which can be actuated, in order to close the retaining jaws (36), by a piston (44) subjected to the pressure of the medium.

17 Claims, 4 Drawing Sheets

(56) References Cited

U.S. PATENT DOCUMENTS

| | | |
|---|---|---|
| 2,362,880 A | 11/1944 | Campbell |
| 2,396,499 A | 3/1946 | Fitch |
| 2,397,342 A * | 3/1946 | Farrell .................... F16N 21/04 184/105.1 |
| 2,425,692 A | 8/1947 | Clapp |
| 2,533,637 A | 12/1950 | Tear |
| 2,578,517 A | 12/1951 | Davis |
| 2,754,135 A | 7/1956 | Kramer |
| 2,764,769 A | 10/1956 | Neuman |
| 2012/0267890 A1 | 10/2012 | Gurney |

FOREIGN PATENT DOCUMENTS

| | | |
|---|---|---|
| FR | 784455 A | 4/1935 |
| FR | 990186 A | 6/1951 |
| FR | 1047543 A | 1/1952 |
| FR | 1003802 A | 3/1952 |
| FR | 1122396 A | 5/1956 |
| GB | 466614 | 6/1937 |
| WO | 2011/069172 A1 | 6/2011 |

\* cited by examiner

COUPLING FOR PRESSURE LINES

BACKGROUND OF THE INVENTION

The invention relates to a coupling for pressure lines, having a housing, which has a continuous conveying duct for a pressurised medium and can be connected by one end to a pressure source attached by the opposite end to a connection nipple, and having retaining jaws which are arranged around the mouth of the conveying duct opening into the connection nipple and which can be fixed by a locking mechanism in a position in which they engage around the connection nipple.

More particularly, the invention relates to a coupling for a lubricating line via which grease from a grease gun is pressed into a lubricating nipple.

Examples of couplings of this type are disclosed in WO2011/069172A1 and U.S. Pat. No. 2,578,517A.

The coupling may be connected directly to the output port of a grease gun or may be connected with the grease gun via a flexible tube or a rigid pipe and can be coupled to a lubricating nipple such that the lubrication grease can be pressed into the nipple. With increasing pressure of the lubricant, the risk increases that the retaining jaws yield and the coupling is detached from the nipple. For this reason, known couplings have a locking mechanism that can be operated manually and lock the retaining jaws in the closed position. This, however, makes the handling of the coupling cumbersome.

There are also known couplings wherein the retaining jaws are self-lockingly held in the closed position, so that they will not yield even under high pressure. In this case, however, it is difficult to detach the coupling from the nipple when the lubricating task has been accomplished.

SUMMARY OF THE INVENTION

It is an object of the invention to provide a coupling which can easily be coupled to the connection nipple and can easily been detached again from the nipple even under high pressure but is not detached automatically under high pressure.

In order to achieve this object, according to the invention, the retaining jaws are each supported on a pivot bearing and have, at the end remote from the connection nipple, beyond the pivot bearing, an actuating arm which can be actuated, in order to close the retaining jaws, be means of a piston subjected to the pressure of the medium.

When the coupling is coupled to the connection nipple and the pressure of the medium increases, a force acting upon the coupling has the tendency to urge the coupling away from the connection nipple. Since the retaining jaws grip around a conical portion of the connection nipple, these retaining jaws are subject to a torque that has the tendency to pivot them in opening direction. However, this torque is compensated by the fact that the piston and the actuating arm exert an opposite torque on each retaining jaw. Since the two opposite torques are both caused by the pressure of the medium and therefore have approximately the same pressure dependency, the system can be balanced such that the force necessary for drawing-off the coupling from the connection nipple is essentially independent of the value of the pressure of the medium, so that, even when the grease has been pressed-in under very high pressure, the coupling can easily be detached from the connection nipple.

Useful details and further developments of the invention are indicated in the dependent claims.

In an advantageous embodiment, the piston is an annular piston which surrounds the conveying duct and is movable in an annular cylinder that is connected to the conveying duct via a radial bore, so that the pressure of the medium can act upon the annular piston. At the front end, the piston can have a conically tapered portion which acts upon the ends of the actuating arms and pivots them radially outwards when the piston moves forward under the increasing pressure of the medium. In this process, the parts of the retaining jaws that are disposed in front of the pivot bearing and are configured as gripping claws, pivot radially inwards so that they firmly grip around the connection nipple.

The gripping claws may be enclosed by a helical spring that biases them radially inwards into the closed position.

The actuating arms of the retaining jaws may be surrounded by an outer sleeve of the housing and, together, may form an external cone that cooperates with in internal cone on the outer sleeve, so that, when the housing is withdrawn from the connection nipple, a torque which pivots the actuating arms in opening direction is exerted onto these actuating arms via the internal cone, so that the retaining jaws are released from the connection nipple and, simultaneously, the piston is pushed back again into the rearward position.

In an advantageous embodiment, the piston may be relieved from the pressure of the medium by means of a withdrawable push sleeve when the coupling is detached.

BRIEF DESCRIPTION OF THE DRAWINGS

An embodiment example will now be described in detail in conjunction with the drawings, wherein.

DETAILED DESCRIPTION

Figure 1:
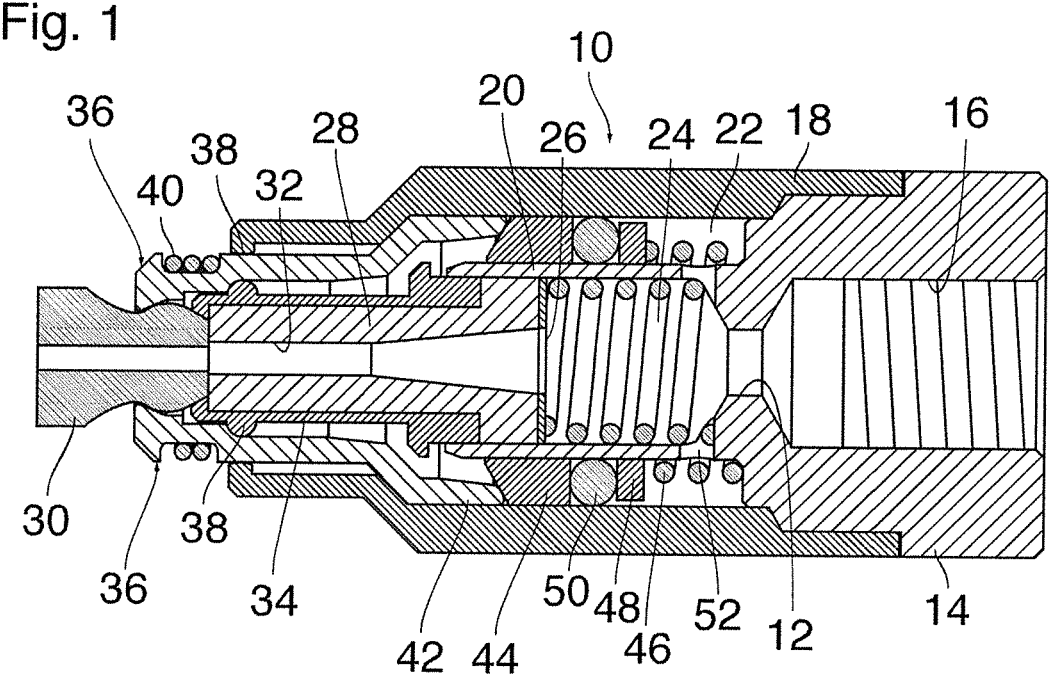
FIG. 1 is a longitudinal section of a coupling according to the invention in a state coupled to a lubricating nipple.

The coupling shown in FIG. 1 has an approximately cylindrical housing 10 which is penetrated by a continuous axial conveying duct 12. A rear part of the housing 10, on the right side in FIG. 1, is formed by an end piece 14 that has an internally threaded bore 16 permitting to screw the coupling onto an outlet port of a grease gun or to a screw fitting of a lubricant tube, so that grease from the grease gun may enter into the conveying duct 12.

Adjoining the front side of the end piece 14 is an outer sleeve 18 that surrounds, with radial spacing, an inner sleeve 20 formed in one piece with the end piece 14, so that an annular space 22 is formed between the inner sleeve 20 and the outer sleeve 18.

The inner sleeve 20 encloses a large-diameter section of the conveying duct 12, which section accommodates a spring 24, a disk 26 and a sealing plug 28. The sealing plug 28 is made of an elastomeric material and projects forwardly from the inner sleeve 20, so that it may be supported with its front end face on an end face of a connection nipple 30

(designated as lubricating nipple 30 hereinafter). The sealing plug is formed with a continuous axial passage 32 that prolongs the conveying duct 12 and opens into a bore of the lubricating nipple 30 at its front end.

The front part of the sealing plug 28 is surrounded by a pressure sleeve 34 which is slidably guided with its rear end in the front end of the inner sleeve 20 and has a front end which straddles the end face of the sealing plug with an inner collar. The spring 24 biases the sealing plug 28 and the pressure sleeve 34 forwards, i.e. to the left side in FIG. 1.

The pressure sleeve 34 is surrounded by at least three retaining jaws 36 distributed over the periphery, said jaws gripping over a conically tapered part of the lubricating nipple 30. Each retaining jaw 36 is supported in a pivot bearing 38 that is constituted by a bulge on the outer peripheral surface of the pressure sleeve and by a nose formed at the front end of the outer sleeve 18 in a position opposite to the bulge. The two retaining jaws 36 that are visible in FIG. 1 are therefore pivotable about an axis which extends at right angles to the longitudinal axis of the coupling, normal to the plane of the drawing in FIG. 1, between the bulge and the nose of the pivot bearing 38. The parts of the retaining jaws 36 situated in front of the pivot bearing 38 each form a gripping claw and are radially biased against the cone of the lubricating nipple 30 by a spring 40 (helical spring) that encloses these gripping claws.

The part of each retaining jaw 36 situated behind the pivot bearing 38 forms an actuating arm 42 which is pivoted radially outwards by the action of the spring 40 and the pivot bearing 38 and therefore engages the inner peripheral wall of the outer sleeve 18 in FIG. 1.

An annular piston 44 and a spring (helical spring) are arranged in the annular space 22 between the outer sleeve 18 and the inner sleeve 20. The spring 46 is supported on a shoulder of the end piece 14 and presses, with its front end and via a disk 48 and a sealing ring 50, onto the piston 44 the slightly conical end face of which is thereby biased against the free ends of the actuating arms 42. The rear part of the annular space 22 that accommodates the spring 46 is connected to the conveying duct 12 by a cross-bore 52 that extends radially through the inner sleeve 20.

Figure 2:
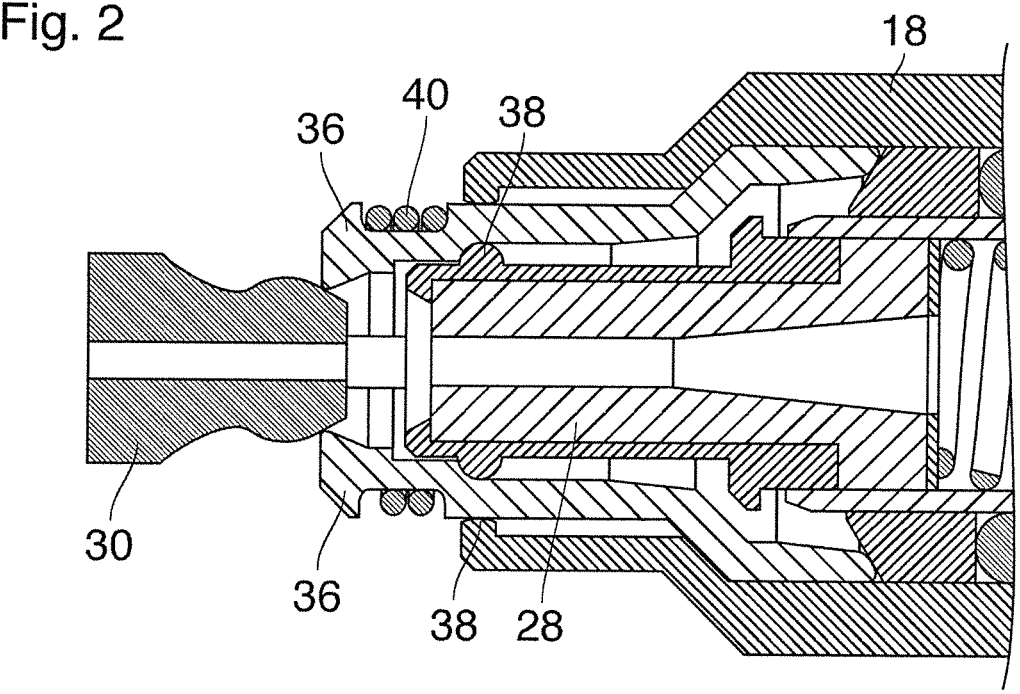
FIG. 2 is an enlarged sectional view of the lubricating nipple and a part of the coupling in a state in which the coupling is set against the lubricating nipple with its front end.

When the coupling is to be engaged with the lubricating nipple 30, it is at first set with its front end against the lubricating nipple 30 in the manner shown in FIG. 2. The spring 40 holds the retaining jaws 36 in a closed position in which their front ends, which form the gripping claws, are pivoted radially inwards. Therefore, in FIG. 2, the radially inner edges of the retaining jaws 36 engage the conically flaring end portion of the lubricating nipple 30, so that the end face of the lubricating nipple does not yet come into engagement with the end face of the sealing plug 28. When, now, the coupling is pressed against the lubricating nipple with a certain force, the retaining jaws 36 are spread at their front ends by the cone of the lubricating nipple, so that they pivot about the pivot bearings 38 against the force of the spring 40, as has been shown in FIG. 3. At the same time the actuating arms 42 move radially inwards and slide, with their free ends, along the conical end face of the piston 44, so that the piston is pushed back against the force of the spring 46. The cone of the end face of the piston 44 is so steep that no self-locking occurs.

Figure 3:
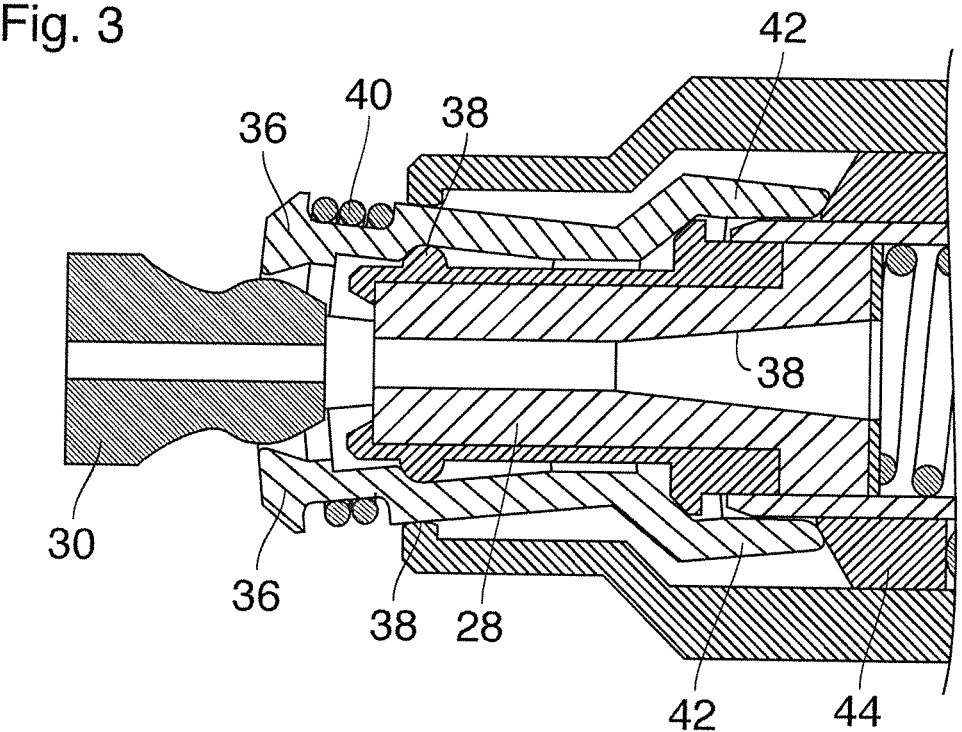
FIG. 3 is a view analogous to FIG. 2, but shows a state during the process of engaging the coupling.
Figure 4:
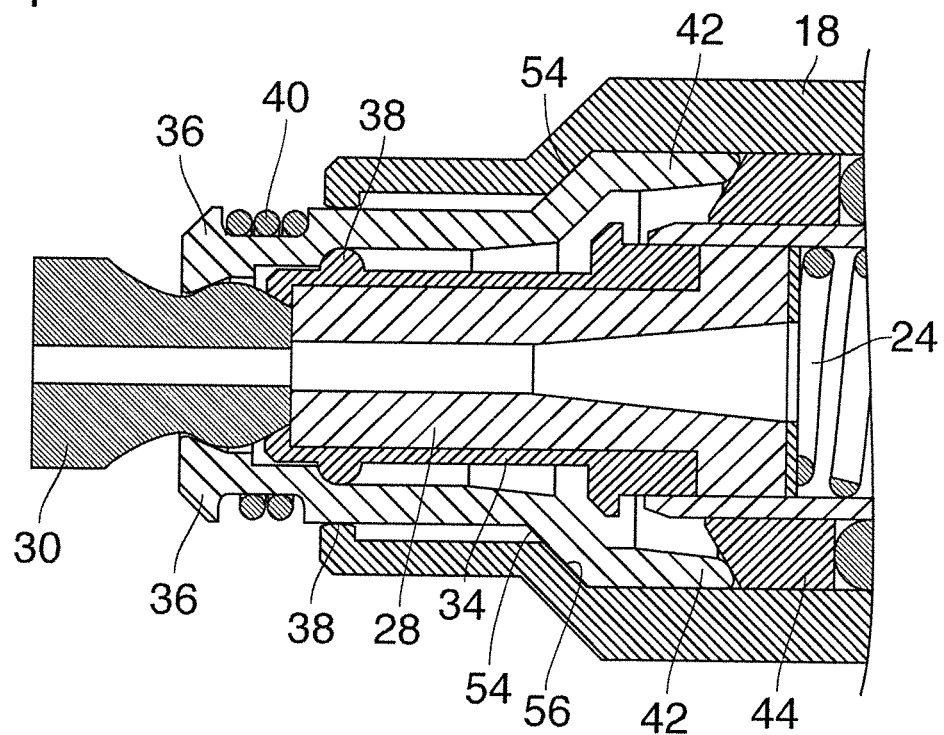
FIG. 4 is a sectional view analysis to FIGS. 2 and 3 for the engaged state of the coupling.

When the coupling is pushed further to the left beyond the position shown in FIG. 3, the gripping claws of the retaining jaws 36 slide over the thickest part of the lubricating nipple, so that they move radially inwards again under the force of the spring 40, supported by the force of the spring 46 that acts upon the actuating arms 42, and they move along the conically tapered peripheral surface of the lubricating nipple and pull the coupling against the lubricating nipple until the position shown in FIG. 4 has been reached. Then, the actuating arms 42 engage again the inner peripheral surface of the outer sleeve 18, and the front end face of the sealing plug 28 engages the end face of the lubricating nipple 30. As the case may be, the sealing plug 28 and the pressure sleeve 34 may be slightly pushed back against the force of the spring 24, so that a tight engagement of the sealing plug 28 at the lubricating nipple 30 is assured.

When, now, grease is pressed out from the grease gun, the grease flows through the conveying duct 12 and the passage 32 of the sealing plug into the lubricating nipple without any grease leaking out at the joint between the sealing plug 28 and the lubricating nipple.

When a certain pressure has built up in the grease in the conveying duct 12, this pressure has the tendency to urge the lubricating nipple 30 and the coupling apart. Without any counter-measures, the coupling would therefore move to the right in FIG. 4 as the pressure increases, whereby the retaining jaws 36 would be pivoted again in opening direction. However, since the grease enters also into the annular space 22 on the back-side of the piston 44 through the cross-bore 52 (FIG. 2), the piston 44 is also subject to the pressure of the grease, and this pressure has the tendency to move the piston to the left in FIG. 4 and to urge it firmly against the end of the actuating arms 42. Due to the conical shape of the end face of the piston, the actuating arms 42 are held in the spread-apart position, and a pivoting of the retaining jaws 36 about the pivot bearings 38 does not have to be prevented by the spring 40 alone but is also counteracted by the pressure of the piston that acts upon the actuating arms 42. Thus, the pressure of the grease induces, on the one hand, due to the force which urges the coupling and the grease nipple 30 apart and due to the conical shape of the lubricating nipple, a torque that acts in opening direction of the retaining jaws 36, and on the other hand, via the piston 44, a counter-torque in closing direction of the retaining jaws.

The effective area of the piston 44, the cone at the end face of this piston, the length of the levers formed the actuating arms 42 and the gripping claws of the retaining jaws 36, and the force of the spring 40 are tuned such that the torques acting in opposite directions are approximately balanced independently of the current pressure of the grease, with a slight dominance of the torque in closing direction, so that the coupling is safely held on the lubricating nipple.

When the greasing operation has been accomplished and the coupling shall be detached from the lubricating nipple 30, the pressure in the conveying duct 12 will generally persist, because a check valve in the grease gun prevents a reflow of the grease. Consequently, the approximate torque balance is initially maintained.

The actuating arms 42 are each angled in such a manner that, together, they form an outer cone 54 (FIG. 4) which engages a complementary inner cone 56 at the inner peripheral surface of the outer sleeve 18. When, now, the coupling is drawn-off from the lubricating nipple 30 by hand, the retaining jaws 36 have the tendency to hold the lubricating nipple, so that the housing 10 will move to the right in FIG. 4 relative to the retaining jaws. At that instant, the cones 54, 56 create an additional torque in opening direction, so that the actuating arms 42 pivot radially inwards and, accordingly, the gripping claws release the lubricating nipple 30. The piston 44 is pushed back by the free ends of the actuating arms 42.

As soon as a small gap has formed between the end face of the sealing plug 28 and the end face of the lubricating nipple 30, the grease, which is still under high pressure, enters into this gap, whereby the force urging the lubricating nipple and the coupling apart is increased. At the same time, the pressure in the conveying duct and in the annular space 22 is released, so that the piston 44 may be pushed back more easily. As soon as the inner edges of the retaining jaws 36 have passed over the bulge of the lubricating nipple 30, the spring 40 supports the further withdrawal movement, and the retaining jaws 36 return into the position shown in FIG. 2.

The retaining jaws 36 are undetachably held in the housing 10 by the outer cone 54 and the inner cone 56 and form a counter-bearing for the bulges of the pivot bearings 38. In this way, also the pressure sleeve 34 and the sealing plug 28 are undetachably held in housing.

Figure 5:
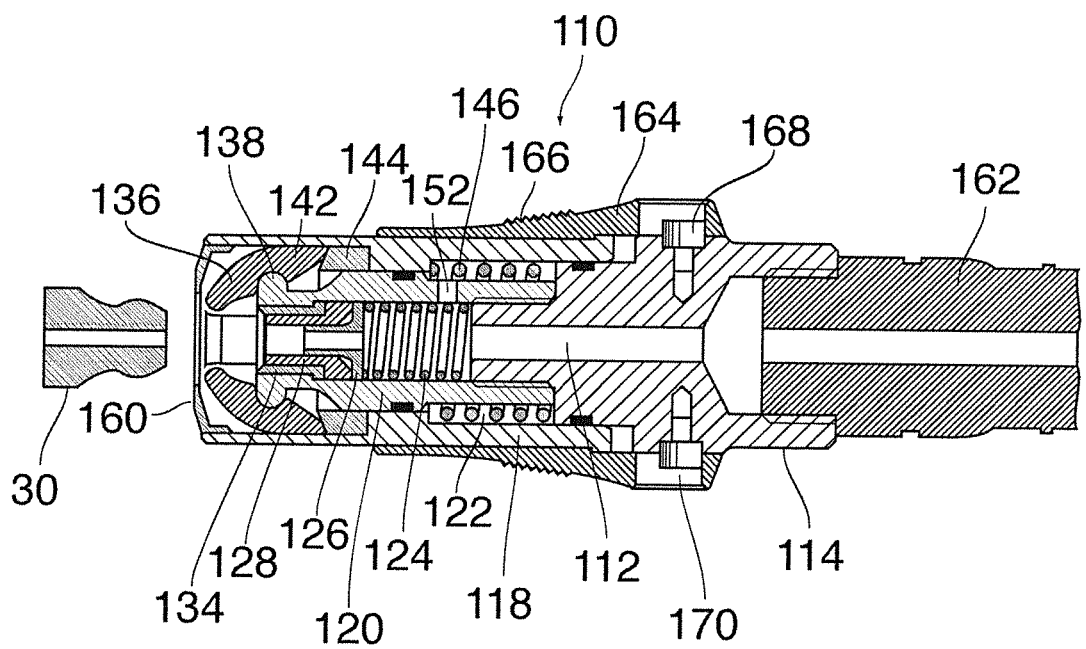
FIGS. 5 to 8 are longitudinal sections of the coupling according to a different embodiment in different stages during the engagement and disengagement of the coupling.

A coupling according to another embodiment has been shown in FIG. 5. Details of this coupling, which have already been explained in conjunction with FIGS. 1 to 4, are designated by the same reference numerals, but increased by 100. Thus, the coupling has a housing 110 comprising a conveying duct 112, an end piece 114, an outer sleeve 118, an inner sleeve 120 forming an annular space 122 with the outer sleeve, a spring 124 between the end piece 114 and a counter-bearing 126 which functionally corresponds to the disk 26 in FIG. 1, as well as a sealing plug 128, a pressure sleeve 134, retaining jaws 136 with actuating arms 142, a piston 144 and a spring 146 in the angular space 122.

Other than in FIGS. 1 to 4, the inner sleeve 120 is in screw-engagement with the end piece 114, and the outer sleeve 118 is axially slidable on the inner sleeve 120 and the end piece 114. The annular space 122 is sealed at both ends, and the spring 146 is supported on a projecting collar of the outer sleeve 118 which itself supports the piston 144.

Pivot bearings 138 for the retaining jaws 136 are formed by radially projecting bulges at the front end of the inner sleeve 120. The outer sleeve 118 does not form pivot bearings for the retaining jaws at its front part, but only limits the pivotal range of the actuating arms 142 and the outward movement of the retaining jaws.

At the front end, the housing 110 is closed by a cap 160 which is guided for axial displacement in the front end of the outer sleeve 118 and is fixed, in the interspaces between the retaining jaws 136 and by means of holding arms which are not visible here, at the bulges of the inner sleeve 120 that form the pivot bearings 138. A central bore of the cap 160 has an internal diameter that is larger than the external diameter of the bulge of the lubricating nipple 30, so that the housing 110 with its cap 160 may be thrust over the lubricating nipple until the retaining jaws 136 slide onto the lubricating nipple.

A connector piece 162 for a lubricating tube has been screwed into the rear end of the end piece 114 in this example.

Guided on the outer sleeve 118 is a sliding sleeve 164 which has corrugations 166 on its conical flanks. The distance of displacement of the sliding sleeve 164 on the outer sleeve 118 is limited by the heads of bolts 168 that are radially screwed into the outer sleeve 118 and are received in elongated holes 170 of the sliding sleeve. In the initial stage shown in FIG. 5, prior to engagement with the lubricating nipple 30, the sliding sleeve 164 is its front end position.

Figure 6:
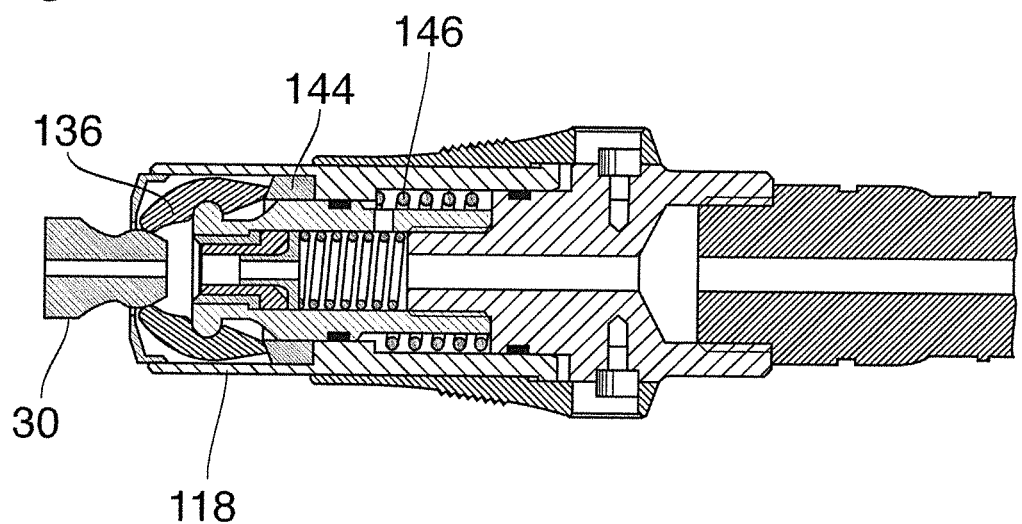

FIG. 6 shows the coupling in a condition in which it is thrust onto the lubricating nipple 30. The front ends of the retaining jaws 136 slide onto the flanks of the lubricating nipple and are pivoted outwards about the pivot bearings 138. Their actuating arms 142 press onto the conical front end face of the piston 144 and push the same backwards together with the outer sleeve 118 and against the force of the spring 146.

Figure 7:
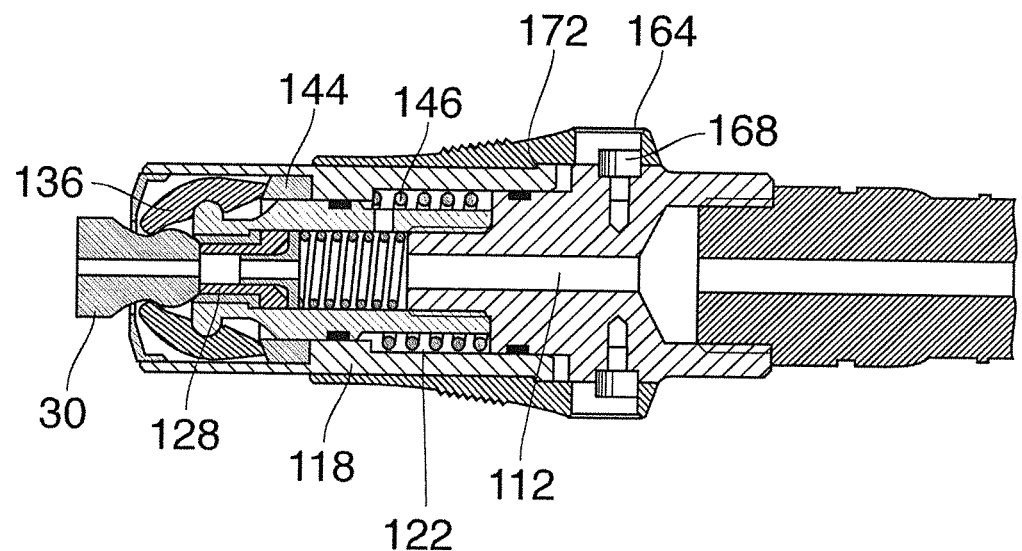

FIG. 7 shows the condition, in which the coupling has been thrust completely onto the lubricating nipple 30 and the grease in the conveying duct 112 has been pressurised. The retaining jaws 136 grip around the bulge of the lubricating nipple and are biased into their closed position by the piston 144. The piston is then subject to an axial force that is transmitted via the collar of the outer sleeve 118 and is created to one part by the force of the spring 146 and to the other part by the pressure of the lubricant in the annular space 122, which pressure acts onto the rear end face of the collar of the outer sleeve 118. The outer sleeve 118 and the piston 144 have thereby been moved forward (to the left in FIG. 7) together. The movement of the outer sleeve 118 is limited by a stop that is formed at the outer periphery and cooperates with a corresponding step 172 of the sliding sleeve 164 which is itself held in its front end position by the bolts 168. The sealing plug 128 is held in sealing engagement with the front end face of the lubricating nipple 30 by the spring 124.

The pressure of the lubricant in the conveying duct 112 has the tendency to urge the entire coupling away from the front end face of the lubricating nipple 30 and thereby to pivot the retaining jaws 36 outwards. This, however, is counter-acted by the force that the piston 144 exerts on the retaining jaws. As in the example described before, the spring forces and the effective piston areas are balanced such that the torque acting on the retaining jaws 136 in closing direction, exerted by the piston 144, is always slightly larger than the torque acting in opposite direction, as caused by the pressure in the conveying duct 112. When the pressure of the lubricant increases, the pressure in the annular space 122 increases as well, and the ratio between the torques acting on the retaining jaws in opposite directions remains essentially constant.

Figure 8:
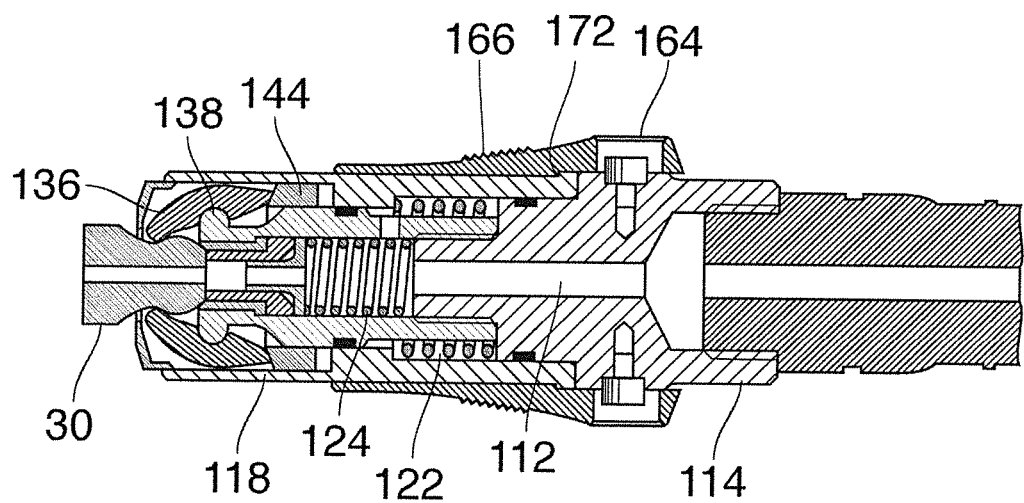

When the coupling is to be detached again from the lubricating nipple 30, the sliding sleeve 164 is gripped at the corrugations 166 and drawn back by hand, as has been shown in FIG. 8. The step 172 entrains the outer sleeve 118, against the force of the spring 146 and the pressure in the annular space 122. Even when the pressure of the lubricant is high, the force that has to be exerted onto the sliding sleeve 164 by hand remains relatively small, because the pressure in the annular space 122 is essentially balanced by the pressure of the lubricant in the conveying duct 112.

When the outer sleeve 118 has reached its rear end position and engages the end piece 114, a pull is exerted onto the retaining jaws 136 via the end piece 114, the inner sleeve 120 and the pivot bearings 138, so that the retaining jaws are withdrawn from the lubricating nipple. The necessary outward pivoting movement of the retaining jaws is made easier due to the fact that the piston 144 is relieved from pressure. This been illustrated in FIG. 8 by showing an axial spacing between the piston 144 and the collar of the outer sleeve 118. In practise, however, this spacing will be cancelled immediately by a corresponding pivotal movement of the retaining jaws 36 and a corresponding rearward movement of the piston 144. The rearward movement of the coupling is assisted by the pressure in the conveying duct 112.

In the initial phase of the withdrawal movement, the sealing plug 128 continues to be held in engagement with the end face of the lubricating nipple 30. Since this sealing plug is made of a rubber-elastic material, it can be somewhat compressed, so that the volume of the portion of the conveying duct that is occupied by the spring 124 may slightly expand so as to accommodate additional lubricant that is displaced out of the annular space 122 when the sliding sleeve 164 and the outer sleeve 118 are drawn back.

In the further course of withdrawal movement, the retaining jaws 136 slide again over the bulge of the lubricating nipple 30, whereby the volume of the conveying duct 112 is increased and the pressure of the lubricant collapses.

The invention claimed is:

1. A coupling for pressure lines, comprising:
    a housing which has a continuous conveying duct for a pressurised medium and is adapted to be connected by one end to a pressure source and attached by an opposite end to a connection nipple,
    retaining jaws arranged around a mouth of the conveying duct opening into the connection nipple and which are adapted to be fixed by a locking mechanism in a position in which the retaining jaws engage around the connection nipple,
    a piston in the housing and subjected to pressure of the medium,
    wherein the retaining jaws are each supported on a pivot bearing and have, at an end remote from the connection nipple, and beyond the pivot bearing, an actuating arm adapted to be actuated, in order to close the retaining jaws, by the piston,
    wherein the piston is arranged in an annular space that annularly surrounds the conveying duct and is connected to the conveying duct by a cross-bore.

2. The coupling according to claim 1, wherein the piston has, at a front end thereof facing the connection nipple, a conical end face with which it engages ends of the actuating arms of the retaining jaws.

3. The coupling according to claim 2, wherein the end face of the piston has a cone angle which is so steep that no self-locking effect occurs between this end face and the ends of the actuating arms.

4. The coupling according to claim 2, further comprising a spring which biases the piston in a direction of the actuating arms.

5. The coupling according to claim 1, further comprising a spring surrounding and radially biasing ends of the retaining jaws that are opposite to the actuating arms and which engage the connection nipple.

6. The coupling according to claim 1, further comprising a sealing plug arranged in the housing, the sealing plug having an end face for engagement with the connection nipple and having a continuous axial passage via which the conveying duct opens into the connection nipple.

7. The coupling according to claim 6, further comprising a pressure sleeve surrounding the sealing plug, and parts of the pivot bearings for the retaining jaws are formed on this pressure sleeve.

8. The coupling according to claim 7, wherein the sealing plug and the pressure sleeve are biased elastically in a direction of an end of the housing to be set against the connection nipple.

9. The coupling according to claim 1, wherein parts of the pivot bearings for the retaining jaws are formed on an internal wall of an outer sleeve of the housing.

10. The coupling according to claim 1, wherein the actuating arms of the retaining jaws are angled such that, together, they form an outer cone that tapers in a direction of the pivot bearings and engages a complementary inner cone formed by the housing.

11. The coupling according to 1, wherein the piston is annular and the pivot bearing is formed at an outer periphery of an inner sleeve on which the annular piston is slidable.

12. The coupling according to claim 11, further comprising an outer sleeve which encloses the retaining jaws and, together with the inner sleeve, forms an annular space via which pressure of the medium acts upon the piston.

13. The coupling according to claim 12, wherein the outer sleeve has an inwardly projecting collar with which it is slidingly guided on the inner sleeve, and the piston is supported at an end face of the collar whereas an opposite end face of the collar delimits the annular space.

14. The coupling according to claim 13, further comprising:
    an end piece wherein the inner sleeve is connected to the end piece,
    a sliding sleeve guided on the end piece for sliding axial movement within a limited range, said sliding sleeve straddling also an outer periphery of the outer sleeve and having a step by which the outer sleeve is adapted to be drawn back in a direction facing away from the piston.

15. The coupling according to claim 1, further comprising a spring which biases the piston in a direction of the retaining jaws.

16. The coupling according to claim 1, wherein an effective area via which pressure of the medium acts upon the piston is dimensioned such that a force acting upon the piston and a force which, due to pressure of the medium, has a tendency to urge the coupling away from the connecting nipple, are balanced in the sense that a force acting in a closing direction of the retaining jaws exceeds a force acting in the opposite direction, independently of the pressure of the medium, only by an amount assuring that the coupling can be drawn-off from the connection nipple by hand in a purely axial movement.

17. The coupling according to claim 1, further comprising a spring which biases the piston in a direction of the retaining jaws, together with an outer sleeve which encloses the retaining jaws.

* * * * *